United States Patent
Shimizu

(10) Patent No.: US 12,348,413 B2
(45) Date of Patent: *Jul. 1, 2025

(54) COMMUNICATION DEVICE, RELAY DEVICE, COMMUNICATION METHOD, AND NON-TRANSITORY COMPUTER READABLE MEDIUM FOR TRANSMISSION OF DATA IN DIFFERENT TRANSMISSION SCHEMES

(71) Applicant: NEC Corporation, Tokyo (JP)

(72) Inventor: Masakazu Shimizu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 296 days.

This patent is subject to a terminal disclaimer.

(21) Appl. No.: 17/858,486

(22) Filed: Jul. 6, 2022

(65) Prior Publication Data

US 2022/0400076 A1    Dec. 15, 2022

Related U.S. Application Data

(63) Continuation of application No. 16/734,506, filed on Jan. 6, 2020, now Pat. No. 11,425,035, which is a
(Continued)

(30) Foreign Application Priority Data

Feb. 20, 2015 (JP) .................... 2015-031707

(51) Int. Cl.
*H04L 45/302* (2022.01)
*H04L 45/52* (2022.01)
(Continued)

(52) U.S. Cl.
CPC ........... *H04L 45/306* (2013.01); *H04L 45/52* (2013.01); *H04L 67/63* (2022.05); *H04L 69/08* (2013.01);
(Continued)

(58) Field of Classification Search
CPC ..... H04L 45/306; H04L 45/52; H04L 67/327; H04L 69/08; H04L 45/123; H04L 49/3009; H04W 40/04
See application file for complete search history.

(56) References Cited

U.S. PATENT DOCUMENTS 6,183,525 B1   2/2001   Jones et al.
6,336,136 B1   1/2002   Niblett et al.
(Continued)

FOREIGN PATENT DOCUMENTS

JP    11-510632 A    9/1999
JP    2002198990 A   7/2002
(Continued)

OTHER PUBLICATIONS

Communication dated Jul. 31, 2016 from Japanese Patent Office in counterpart application No. 2015-031707.
(Continued)

*Primary Examiner* — Justin T Van Roie
(74) *Attorney, Agent, or Firm* — Sughrue Mion, PLLC

(57) ABSTRACT

A communication device (100) includes a plurality of communication units (103-1, 103-2) that transmit data in different transmission schemes from one another, a route selector (101) that searches for a most appropriate communication route and gives an instruction to transmit data from the communication unit corresponding to the most appropriate communication route, and a converter/sorter (102) that converts data into a format compatible with a transmission scheme of the most appropriate communication route and outputs the converted data to the communication unit indicated by the route selector (101), wherein the communication unit corresponding to the most appropriate communication route transmits the converted data. It is thereby possible to perform communications using the most appropriate communication route among a plurality of transmis-
(Continued)

sion schemes even in the case where an application is not compatible with the data format or protocol of the most appropriate communication route.

16 Claims, 15 Drawing Sheets

Related U.S. Application Data continuation of application No. 15/551,806, filed as application No. PCT/JP2016/000161 on Jan. 14, 2016, now Pat. No. 10,567,278.

(51) Int. Cl.
*H04L 67/63* (2022.01)
*H04L 69/08* (2022.01)
*H04L 45/12* (2022.01)
*H04L 49/00* (2022.01)
*H04W 40/04* (2009.01)

(52) U.S. Cl.
CPC ........ *H04L 45/123* (2013.01); *H04L 49/3009* (2013.01); *H04W 40/04* (2013.01)

(56) References Cited

U.S. PATENT DOCUMENTS

| | | | |
|---|---|---|---|
| 7,254,140 B1 | 8/2007 | Rokhsaz | H04L 67/28 370/465 |
| 10,567,278 B2 | 2/2020 | Shimizu | H04L 69/08 |
| 11,425,035 B2 * | 8/2022 | Shimizu | H04L 67/63 |
| 2009/0080430 A1 | 3/2009 | Cha | |
| 2011/0044176 A1 | 2/2011 | Li | |
| 2011/0310748 A1 | 12/2011 | Mizugaki et al. | |
| 2012/0044954 A1 | 2/2012 | Matsumoto | H04L 29/12028 370/485 |
| 2012/0310599 A1 | 12/2012 | Tanaka et al. | |
| 2015/0172424 A1 | 6/2015 | Sone | H04L 69/08 370/401 |
| 2016/0105523 A1 | 4/2016 | Dowdell | |

FOREIGN PATENT DOCUMENTS

| | | |
|---|---|---|
| JP | 2005 033296 A | 2/2005 |
| JP | 2008148019 A | 6/2008 |
| JP | 2010-245825 A | 10/2010 |
| JP | 2012-4891 A | 1/2012 |
| JP | 2013-13049 A | 1/2013 |
| JP | 2013-48478 A | 3/2013 |

OTHER PUBLICATIONS

International Search Report for PCT/JP2018/000161, dated Feb. 23. 2016.

Li et al., "A Direction Based Geographic Routing Scheme for Intermittently Connected Mobile Networks", 2008 IEEE/IFIR International Conference on Embedded and Ubiquitous Computing (Year: 2008).

* cited by examiner

COMMUNICATION DEVICE, RELAY DEVICE, COMMUNICATION METHOD, AND NON-TRANSITORY COMPUTER READABLE MEDIUM FOR TRANSMISSION OF DATA IN DIFFERENT TRANSMISSION SCHEMES

CROSS-REFERENCE TO RELATED APPLICATIONS

The present application is a continuation application of U.S. patent application Ser. No. 16/734,506, now U.S. Pat. No. 11,425,035, filed on Jan. 6, 2020, which is a continuation application of U.S. application Ser. No. 15/551,806 filed on Aug. 17, 2017, which is issued as U.S. Pat. No. 10,567,278, which is a National Stage Entry of international application PCT/JP2016/000161 filed on Jan. 13, 2016, which claims the benefit of priority from Japanese Patent Application 2015-031707 filed on Feb. 20, 2015, the disclosures of all of which are incorporated in their entirety by reference herein.

TECHNICAL FIELD

The present invention relates to a communication device, a relay device, a communication method, and a non-transitory computer readable medium.

BACKGROUND ART

A technique of performing wireless communications using a plurality of transmission schemes has been studied recently as a method for improving the reliability of wireless communications.

Patent Literature 1 discloses an ad hoc wireless communication system in which a coordinator that grasps the status of communication environment gives instructions to set a plurality of routes by a plurality of wireless schemes (transmission schemes).

Further, Patent Literature 2 discloses a communication device that selects a suitable transmission scheme according to the mobile conditions and kinds of utilization of the communication device.

CITATION LIST

Patent Literature

PTL1: Japanese Unexamined Patent Application Publication No. 2012-4891
PTL2: Japanese Unexamined Patent Application Publication No. 2010-245825

SUMMARY OF INVENTION

Technical Problem

However, the above techniques have a problem that, when performing communications using the most appropriate communication channel among a plurality of transmission schemes, it is not possible to perform communications through the most appropriate communication channel in the case where an application is not compatible with the data format or protocol of the most appropriate communication route.

An exemplary object of the present invention is to provide a communication device, a relay device, a communication method, and a communication program capable of performing communications even when an application is not compatible with the data format or protocol of the most appropriate communication route.

Solution to Problem

A communication device according to an exemplary aspect of the present invention includes a plurality of communication units that transmit data in different transmission schemes from one another, a route selector that searches for a most appropriate communication route and gives an instruction to transmit data from the communication unit corresponding to the most appropriate communication route, and a converter/sorter that converts data into a format compatible with a transmission scheme of the most appropriate communication route, and outputs the converted data to the communication unit indicated by the route selector, wherein the communication unit corresponding to the most appropriate communication route transmits the converted data.

A communication device according to an exemplary aspect of the present invention includes a plurality of communication units that receive data in different transmission schemes from one another, and a converter/sorter that converts data received by any one of the plurality of communication units into a format of an application specified by header information, and outputs the converted data to the application.

A relay device according to an exemplary aspect of the present invention includes a plurality of first communication units that receive data in different transmission schemes from one another, a plurality of second communication units that transmit data in different transmission schemes from one another, a route selector that searches for a most appropriate communication route, and gives an instruction to transmit data from the second communication unit corresponding to the most appropriate communication route, and a converter/sorter that converts data received by the first communication unit into a format compatible with a transmission scheme of the most appropriate communication route and outputs the converted data to the second communication unit indicated by the route selector, wherein the second communication unit corresponding to the most appropriate communication route transmits the converted data.

A communication method according to an exemplary aspect of the present invention includes a search step of searching for a most appropriate communication route from different transmission schemes from one another, a conversion step of converting data into a format compatible with a transmission scheme of the most appropriate communication route, and a transmitting step of transmitting the converted data through the most appropriate communication route.

A communication method according to an exemplary aspect of the present invention includes a receiving step of receiving data in any one of different transmission schemes from one another, a conversion step of converting data received in any one of the transmission schemes into a format of an application specified by header information, and an output step of outputting the converted data to the application.

A non-transitory computer readable medium according to an exemplary aspect of the present invention stores a communication program causing a computer to execute a search step of searching for a most appropriate communication route from different transmission schemes from one another, a conversion step of converting data into a format compatible with a transmission scheme of the most appropriate communication route, and a transmitting step of transmitting the converted data through the most appropriate communication route.

A non-transitory computer readable medium according to an exemplary aspect of the present invention stores a communication program causing a computer to execute a receiving step of receiving data in any one of different transmission schemes from one another, a conversion step of converting data received in any one of the transmission schemes into a format of an application specified by header information, and an output step of outputting the converted data to the application.

ADVANTAGEOUS EFFECTS OF INVENTION

According to the communication device, the relay device, the communication method and the communication program according to exemplary aspects of the invention, it is possible to perform communications using the most appropriate communication route among a plurality of transmission schemes even in the case where an application is not compatible with the data format or protocol of the most appropriate communication route.

DESCRIPTION OF EMBODIMENTS

Overview of Exemplary Embodiment

An exemplary embodiment of the present invention is described hereinafter with reference to the drawings.

Figure 1:
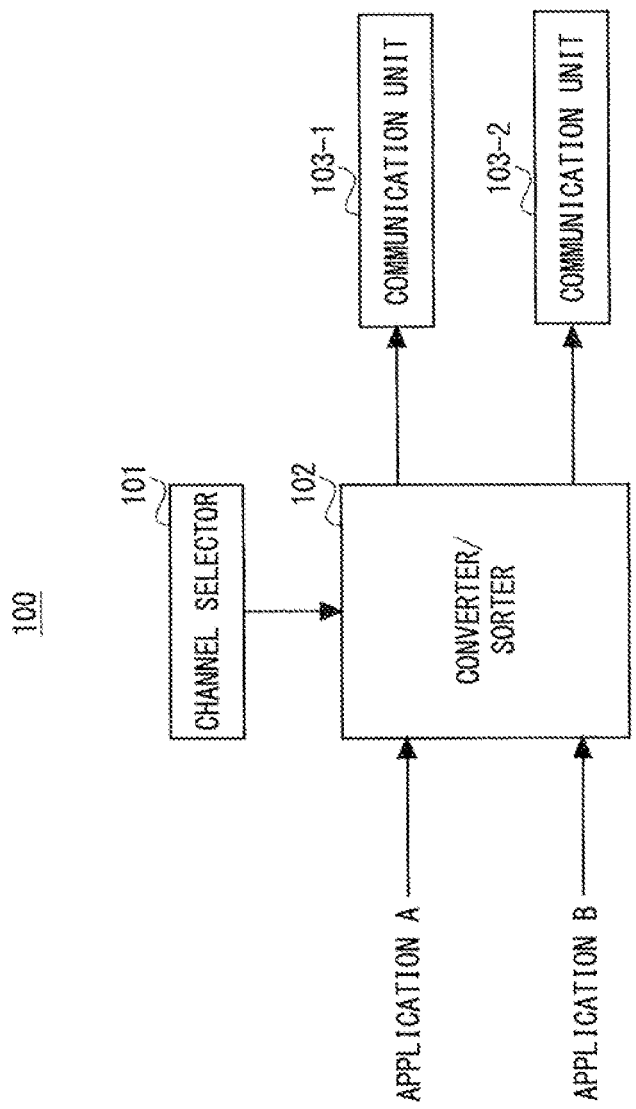
FIG. 1 is a block diagram showing the configuration of a communication device according to an exemplary embodiment.

FIG. 1 is a block diagram showing the configuration of a communication device according to an exemplary embodiment. In FIG. 1, a communication device 100 includes a route selector 101, a converter/sorter 102, and communication units 103-1 and 103-2.

The route selector 101 searches for the most appropriate communication route and gives the converter/sorter 102 an instruction to transmit data from the communication unit 103-1 or 103-2 corresponding to the most appropriate communication route.

The converter/sorter 102 receives data from an application A, or an application B in a different format from the application A. The converter/sorter 102 then converts the data into a format compatible with the communication unit 103-1 or 103-2 which is specified by the route selector 101. After that, the converter/sorter 102 outputs the converted data to the communication unit 103-1 or 103-2 which is specified by the route selector 101.

The communication unit 103-1 transmits the data output from the converter/sorter 102 to the other end of a communication in a first transmission scheme. The communication unit 103-2 transmits the data output from the converter/sorter 102 to the other end of a communication in a second transmission scheme. The first transmission scheme and the second transmission scheme are transmission schemes different from each other.

In the above configuration, the communication device 100 converts application data into the format compatible with the most appropriate communication route and transmits the converted data.

Figure 2:
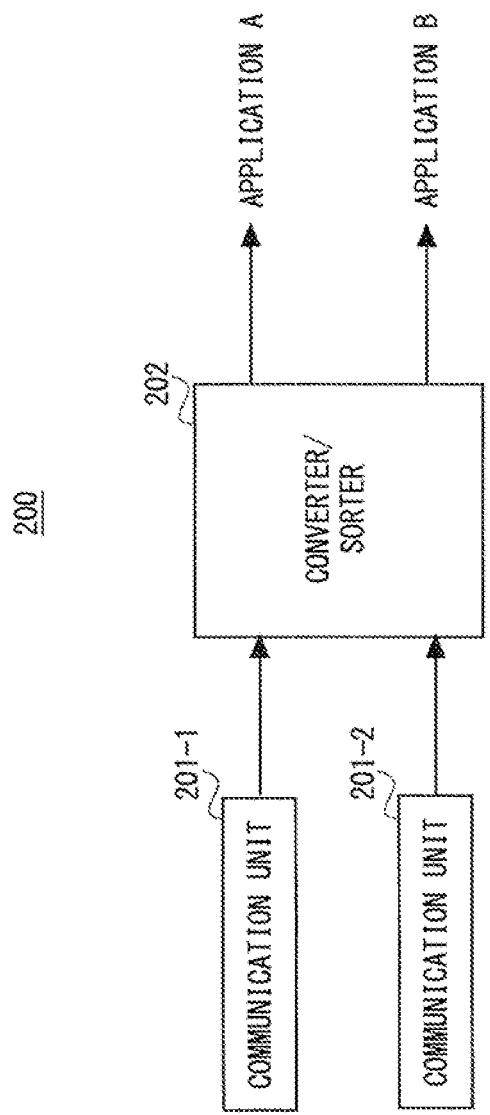
FIG. 2 is a block diagram showing the configuration of a communication device according to an exemplary embodiment.

Hereinafter, a communication device that receives data transmitted from the communication device 100 shown in FIG. 1 is described. FIG. 2 is a block diagram showing the configuration of a communication device according to an exemplary embodiment. In FIG. 2, a communication device 200 includes communication units 201-1 and 201-2 and a converter/sorter 202.

The communication unit 201-1 receives data transmitted from the communication device 100 of FIG. 1 in the first transmission scheme and outputs the data to the converter/sorter 202. The communication unit 201-2 receives data transmitted from the communication device 100 of FIG. 1 in the second transmission scheme and outputs the data to the converter/sorter 202.

The converter/sorter 202 converts the data received by the communication unit 201-1, 201-2 into the format that is compatible with an application to which the data is to be output, and outputs the converted data to the application A or B.

In this manner, the communication device according to the exemplary embodiment selects the most appropriate communication route from a plurality of transmission schemes and transmits application data after converting it into the format of the most appropriate communication route, and it is thereby possible to perform communications even in the case where an application is not compatible with the data format or protocol of the most appropriate communication route.

Further, the communication device according to the exemplary embodiment receives data transmitted through the most appropriate communication route and converts the received data into the format that is compatible with an application, and it is thereby possible to perform communications using the most appropriate communication route among a plurality of transmission schemes even in the case where an application is not compatible with the data format or protocol of the most appropriate communication route.

The details of these communication devices are described in the following exemplary embodiments.

First Exemplary Embodiment

In the first exemplary embodiment, an example in which IP (Internet Protocol) and Non-IP (Non-Internet Protocol) are combined for an application and a transmission scheme is described. The non-IP application and transmission scheme are, for example, VICS (registered trademark) (Vehicle Information and Communication System) and radio beacon and FM (Frequency Modulation) multiple broadcasting for transmitting VICS data. Another non-IP application and transmission scheme may be used as a matter of course.

Figure 3:
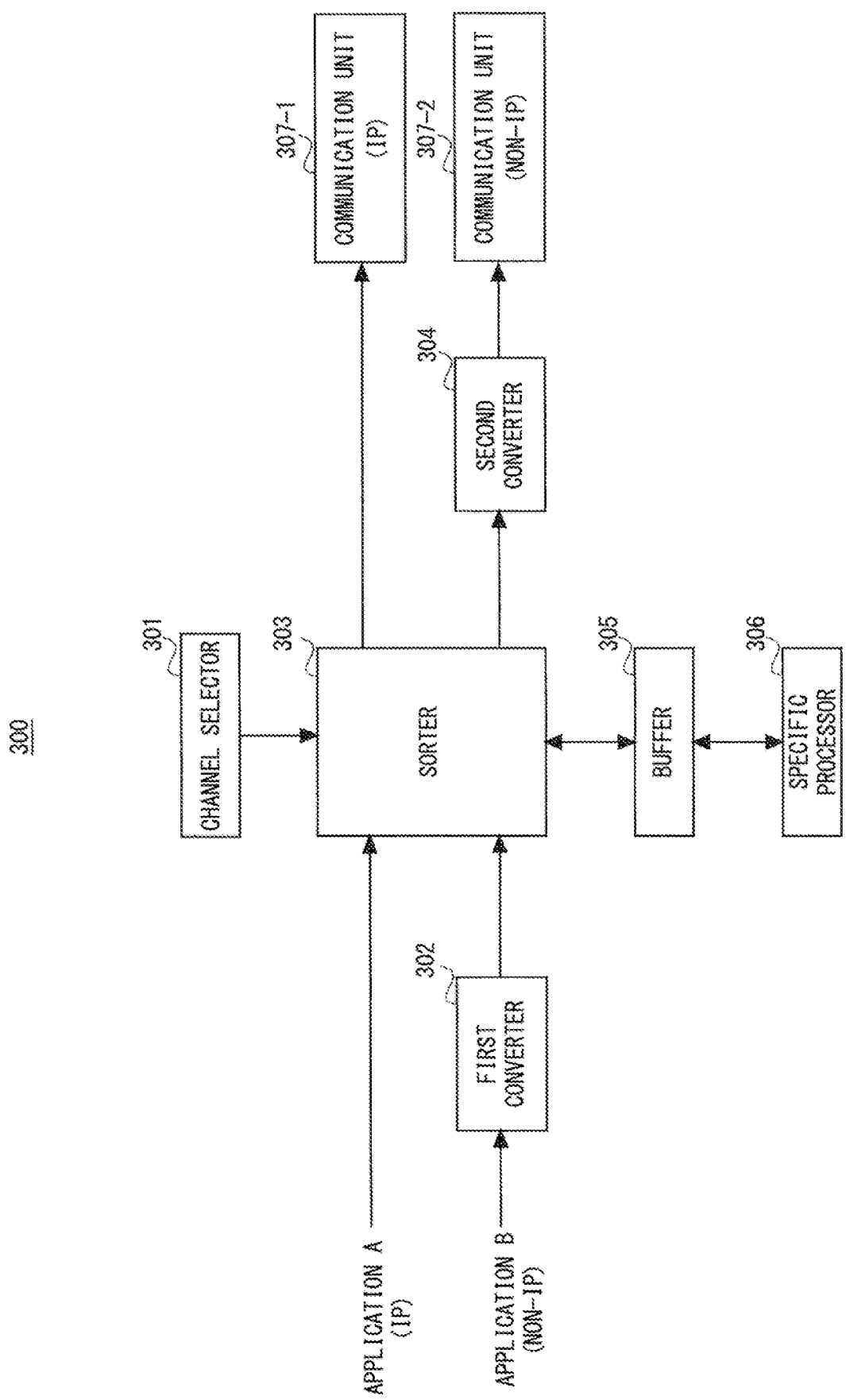
FIG. 3 is a block diagram showing the configuration of a communication device according to a first exemplary embodiment.

FIG. 3 is a block diagram showing the configuration of a communication device according to the first exemplary embodiment. In FIG. 3, a communication device 300 includes a route selector 301, a first converter 302, a sorter 303, a second converter 304, a buffer 305, a specific processor 306, and communication units 307-1 and 307-2.

The route selector 301 searches for the most appropriate communication route based on terminal information and communication environment information, and selects the most appropriate communication route. The route selector 301 then gives the sorter 303 an instruction to output data to a communication unit corresponding to the most appropriate communication route.

The first converter 302 converts the format of data of a non-IP application B and outputs the data converted into an IP format to the sorter 303. The conversion of format is, for example, addition of an IP header.

The sorter 303 outputs the IP data to the communication unit 307-1 or the second converter 304 in accordance with an instruction from the route selector 301. Further, when specific processing is required, the sorter 303 transmits the data to the specific processor 306 through the buffer 305, and outputs the data processed by the specific processor 306 to the communication unit 307-1 or the second converter 304 in accordance with an instruction from the route selector 301.

The second converter 304 converts the data output from the sorter 303 into non-IP format, and outputs the converted data to the communication unit 307-2. The conversion of format is, for example, addition of a header to be compatible with a non-IP transmission scheme.

The buffer 305 is a buffer that transmits and receives data to and from the sorter 303 and the specific processor 306, and temporarily stores data in a data exchange between the sorter 303 and the specific processor 306. Further, the buffer 305 temporarily stores data for which a data transmission delay is allowed.

The specific processor 306 performs secrecy processing such as encryption, compression of data and the like, and outputs the processed data to the sorter 303 through the buffer 305.

The route selector 301, the first converter 302, the sorter 303, the second converter 304, the buffer 305 and the specific processor 306 are preferably composed of a microcomputer or the like including an ASIC (Application Specific Integrated Circuit) or a CPU (Central Processing Unit).

The communication unit 307-1 is a communication unit that transmits data in a transmission scheme that is compatible with IP. The communication unit 307-2 is a communication unit that transmits data in a transmission scheme that is not compatible with IP, and which is instead compatible with non-IP. The communication units 307-1 and 307-2 are, for example, preferably composed of an electronic circuit that performs modulation, frequency conversion and power amplification, and an antenna.

Figure 4:
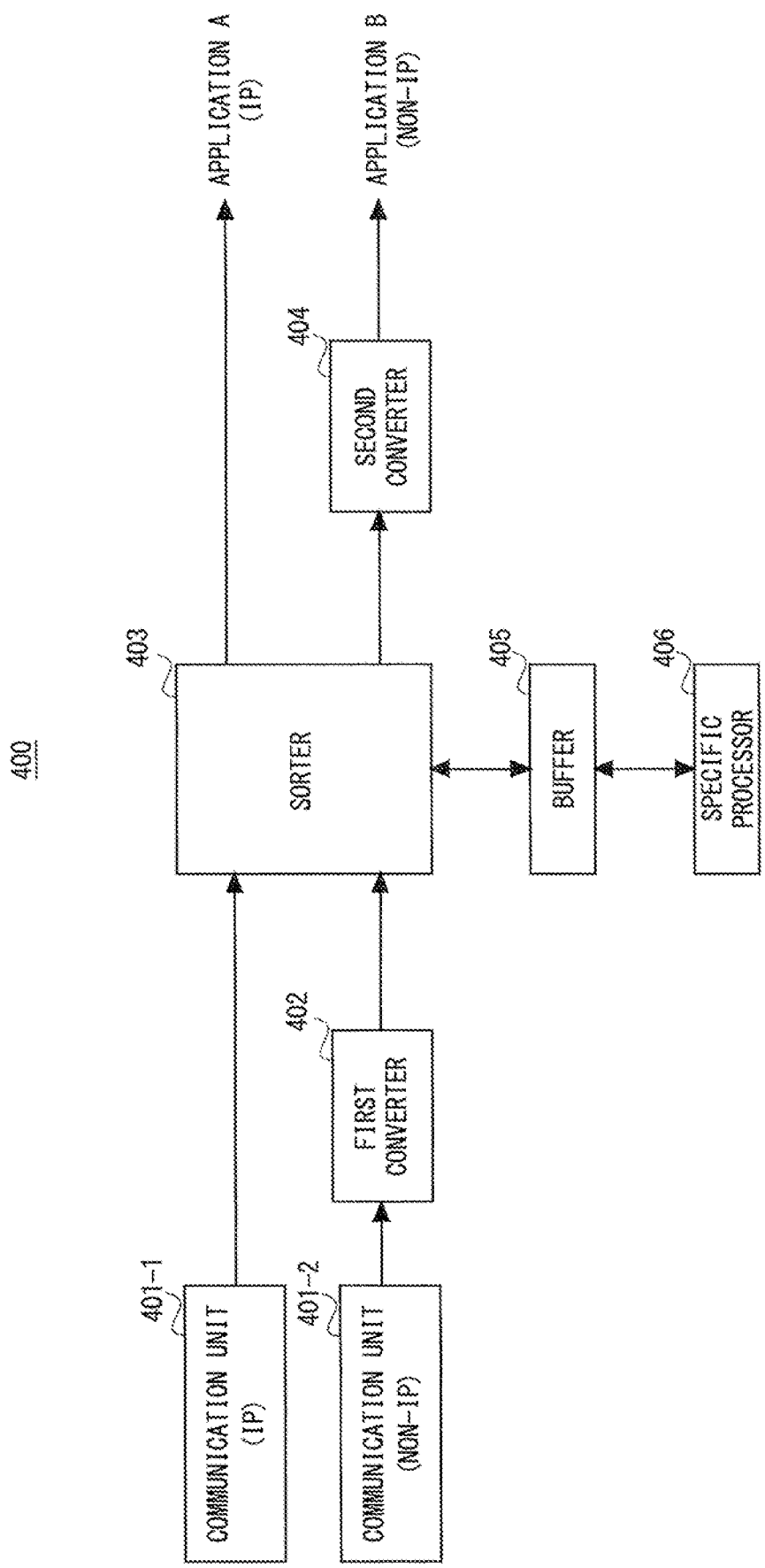
FIG. 4 is a block diagram showing the configuration of the communication device according to the first exemplary embodiment.

In this configuration, the communication device 300 converts data of an application in a different format into a format that is compatible with the most appropriate communication route and transmits the converted data. Hereinafter, a communication device that receives data transmitted from the communication device 300 shown in FIG. 3 is described. FIG. 4 is a block diagram showing the configuration of a communication device according to the first exemplary embodiment. In FIG. 4, a communication device 400 includes communication units 401-1 and 401-2, a first converter 402, a sorter 403, a second converter 404, a buffer 405, and a specific processor 406.

The communication unit 401-1 receives data transmitted from the communication device 300 of FIG. 3 in a transmission scheme that is compatible with IP, and outputs the data to the sorter 403. The communication unit 401-2 receives data transmitted from the communication device 300 of FIG. 3 in a transmission scheme that is not compatible with IP, and outputs the data to the first converter 402. The communication units 401-1 and 401-2 are preferably composed, for example, of an antenna and an electronic circuit that performs power amplification, frequency conversion and demodulation.

The first converter 402 converts the data received by the communication unit 401-2 into IP format, and outputs the converted data to the sorter 403.

The sorter 403 outputs the data to the application A that is compatible with IP or the second converter 404 in accordance with header information of the data. Further, when specific processing is required, the sorter 403 outputs the data to the specific processor 406 through the buffer 405, and outputs the data processed by the specific processor 406 to the application A that is compatible with IP or the second converter 404.

The second converter 404 converts the data into a non-IP format, and outputs the converted data to the application B that is compatible with non-IP.

The buffer 405 is a buffer that transmits and receives data to and from the sorter 403 and the specific processor 406, and temporarily stores data in a data exchange between the sorter 403 and the specific processor 406.

The specific processor 406 performs processing such as decoding, decompression of data and the like, and outputs the processed data to the sorter 403 through the buffer 405.

The first converter 402, the sorter 403, the second converter 404, the buffer 405, and the specific processor 406 are preferably composed of a microcomputer or the like including ASIC or CPU.

Communications between the communication device 300 in FIG. 3 and the communication device 400 in FIG. 4 are described hereinafter. Between the communication device 300 and the communication device 400, IP data or non-IP data is transmitted in a transmission scheme that is compatible with IP or in a transmission scheme that is not compatible with IP. Hereinafter, communications are described for each combination of data and a transmission scheme.

Figure 5:
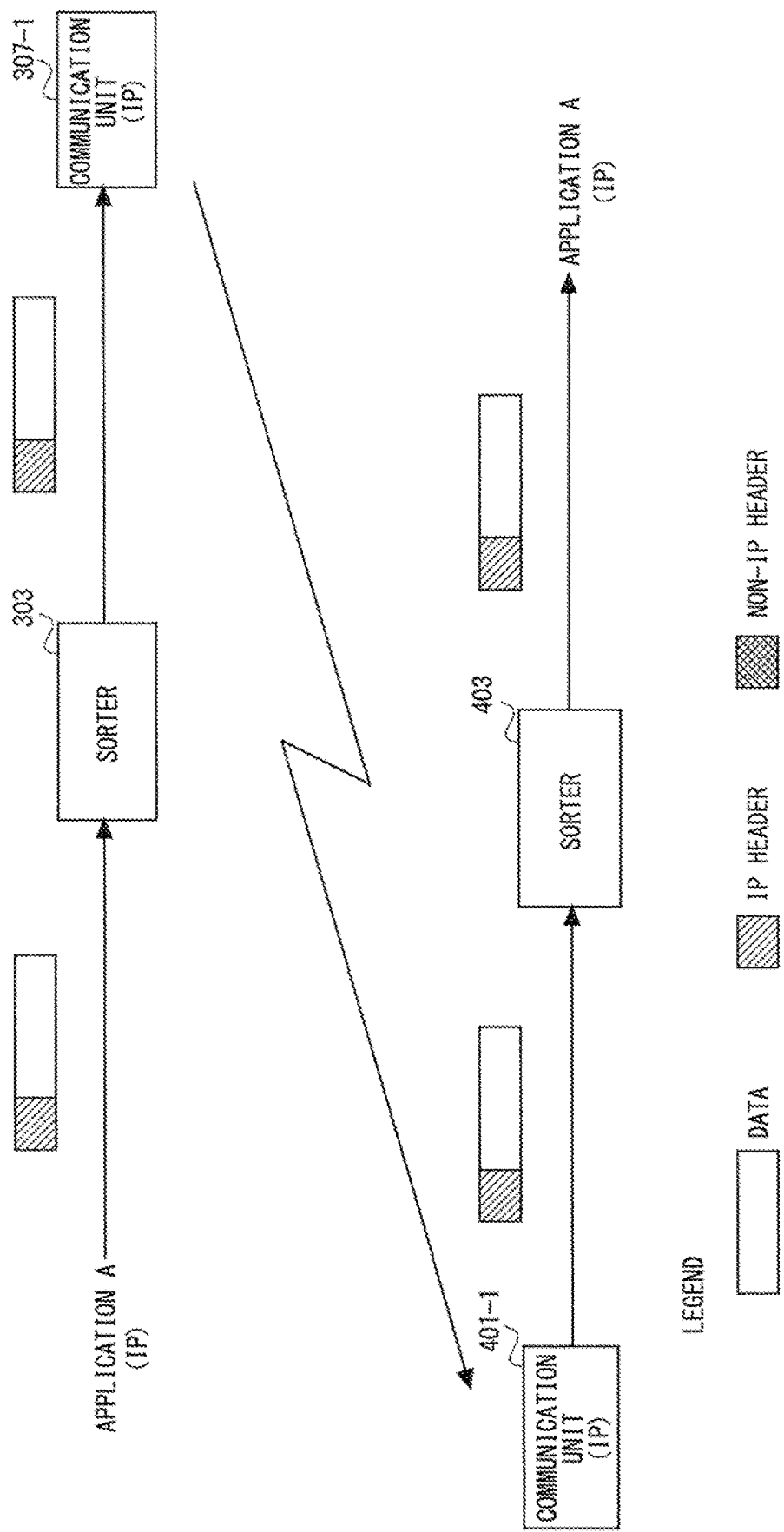
FIG. 5 is a view showing an example of a transmission process according to the first exemplary embodiment.

First, the case where IP data is transmitted in a transmission scheme that is compatible with IP is described hereinafter. FIG. 5 is a view showing an example of a transmission process according to the first exemplary embodiment.

As shown in FIG. 5, IP data that is output from the application A is input to the sorter 303, containing an IP header. Because IP data is transmitted in a transmission scheme that is compatible with IP in FIG. 5, the IP data is output to the communication unit 307-1 without conversion into another format.

Then, the IP data is transmitted from the communication unit 307-1 to the communication device 400 in a transmission scheme that is compatible with IP. The IP data is received by the communication unit 401-1 in the communication device 400. The received IP data is output to the sorter 403 without format conversion.

The sorter 403 checks the header contained in the received IP data, determines that the data is addressed to the application A from the port number of a higher-level protocol such as TCP/UDP, and outputs the IP data to the application A that is compatible with IP.

In this manner, in the case of transmitting IP data in a transmission scheme that is compatible with IP, the IP data is transmitted without conversion.

Figure 6:
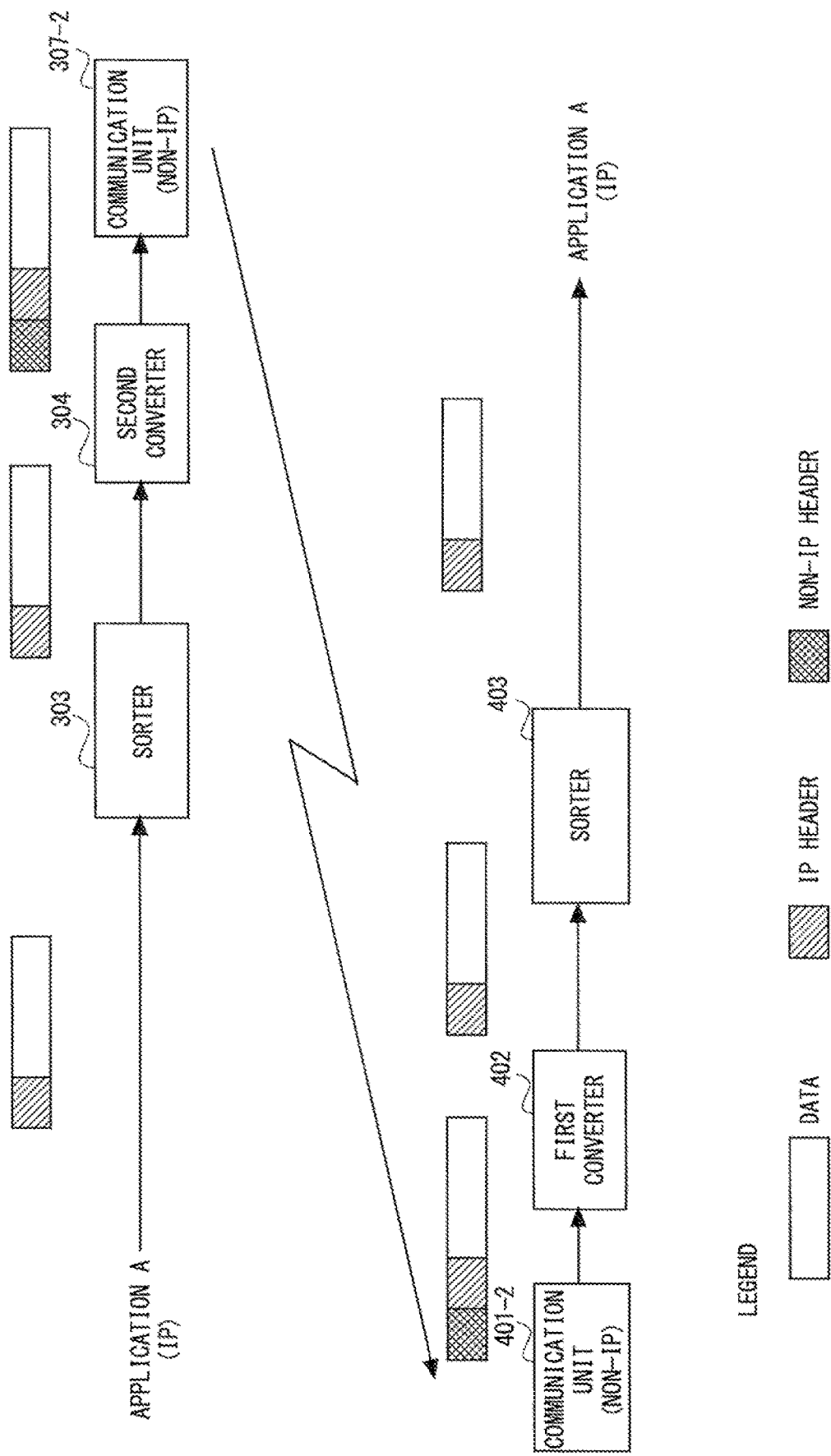
FIG. 6 is a view showing an example of a transmission process according to the first exemplary embodiment.

Next, the case where IP data is transmitted in a transmission scheme that is not compatible with IP is described hereinafter. FIG. 6 is a view showing an example of a transmission process according to the first exemplary embodiment.

As shown in FIG. 6, IP data that is output from the application A is input to the sorter 303, containing an IP header. Because IP data is transmitted in a transmission scheme that is not compatible with IP in FIG. 6, the IP data is output to the second converter 304.

Then, in the second converter 304, a non-IP header is added to the IP data, and the data is converted into a non-IP format. The converted IP data is then output to the communication unit 307-2.

The IP data that has been converted into the non-IP format is then transmitted from the communication unit 307-2 to the communication device 400 in a transmission scheme that is not compatible with IP. The IP data converted into the non-IP format is received by the communication unit 401-2 in the communication device 400. The IP data converted into the non-IP format is output from the communication unit 401-2 to the first converter 402.

In the first converter 402, the non-IP header is removed from the IP data converted into the non-IP format. The IP data is then output to the sorter 403.

The sorter 403 checks the header contained in the received IP data, and outputs the IP data to the application A that is compatible with IP.

In this manner, in the case of transmitting IP data in a transmission scheme that is not compatible with IP, the IP data is converted into the non-IP format and transmitted at the transmitting end, and it is then converted from the non-IP format to the IP format at the receiving end.

Figure 7:
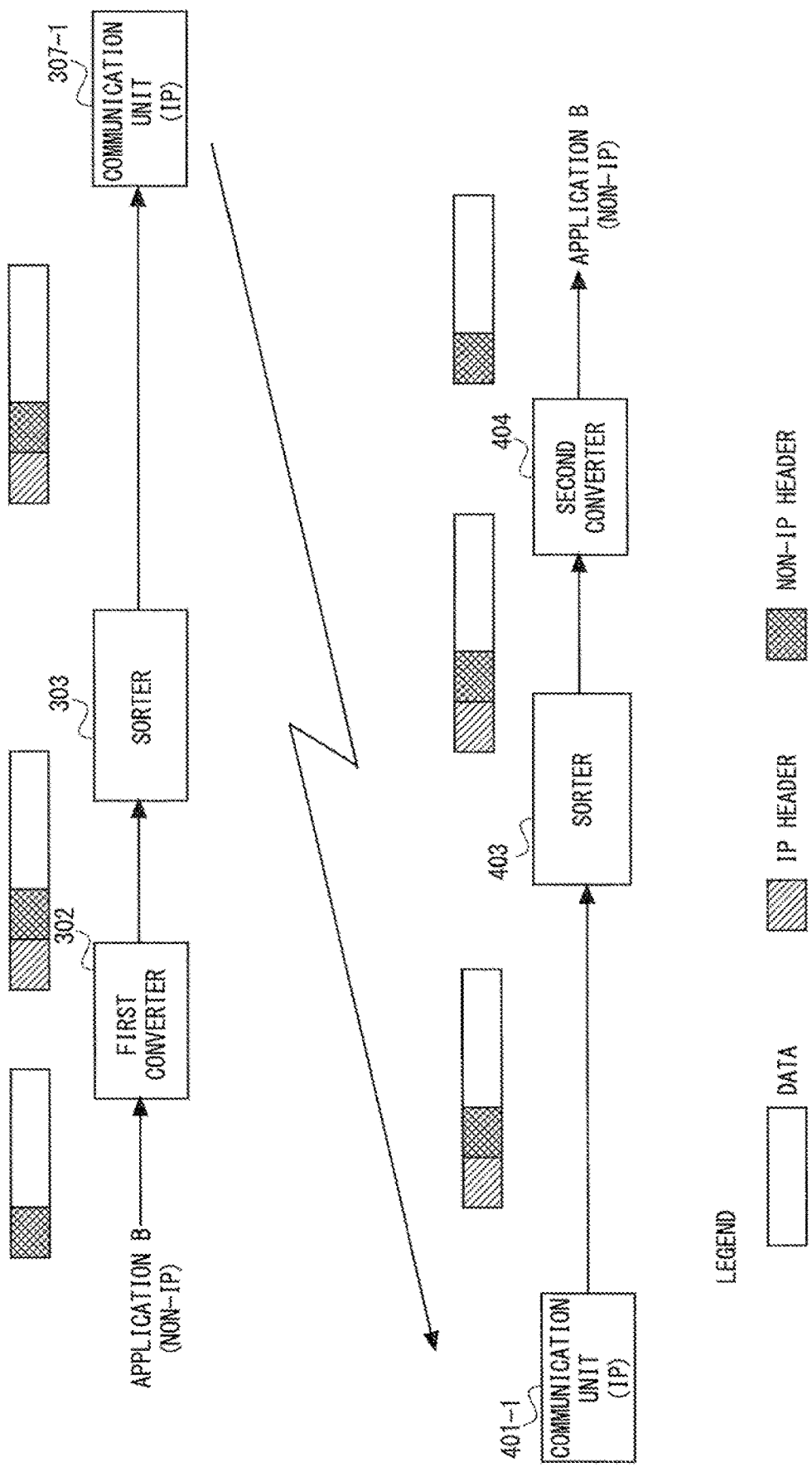
FIG. 7 is a view showing an example of a transmission process according to the first exemplary embodiment.

The case where non-IP data is transmitted in a transmission scheme that is compatible with IP is described hereinafter. FIG. 7 is a view showing an example of a transmission process according to the first exemplary embodiment.

As shown in FIG. 7, non-IP data that is output from the application B is input to the first converter 302, as containing a non-IP header, and it is converted into IP format.

To be specific, in the second converter 304, an IP header is added to the non-IP data, and the data is converted into IP format. The IP address in the IP header is determined according to a transmission scheme to be used. Further, a pseudo port number of TCP/UDP header is set so that an application into which the data is to be sorted can be determined at the receiving end. It is preferred that the correspondence of such information is defined in advance between the route selector 301 and the sorter 303 at the transmitting end and the sorter 403 at the receiving end.

Then, the non-IP data that has been converted into IP format is input to the sorter 303, containing the IP header. The non-IP data has been already converted into IP format when input to the sorter 303, and it is output from the sorter 303 to the communication unit 307-1.

The non-IP data that has been converted into IP format is then transmitted from the communication unit 307-1 to the communication device 400 in a transmission scheme that is compatible with IP. The non-IP data converted into IP format is received by the communication unit 401-1. The non-IP data that is received by the communication unit 401-1 is in the state of being converted into IP format.

For the non-IP data that has been converted into IP format, the sorter 403 determines an application to which the data is to be output based on the port number of the TCP/UDP header or the like. In the case of FIG. 7, the non-IP data is data to be executed by a non-IP application, and it needs to be converted from IP format. Thus, the non-IP data is output from the sorter 403 to the second converter 404.

Then, in the second converter 404, the IP header is removed from the non-IP data converted into IP format, and further the non-IP header that has been handled as a part of data in IP format is set as header information. In other words, by conversion in the second converter 404, the non-IP data is converted from IP format into non-IP format.

The non-IP data after conversion is output from the second converter 404 to the application B. Because the non-IP data has been returned to its original non-IP format, it can be processed in the application B.

In this manner, in the case of transmitting non-IP data in a transmission scheme that is compatible with IP, the non-IP data is converted into IP format and transmitted at the transmitting end, and it is converted from IP format to non-IP format at the receiving end.

Figure 8:
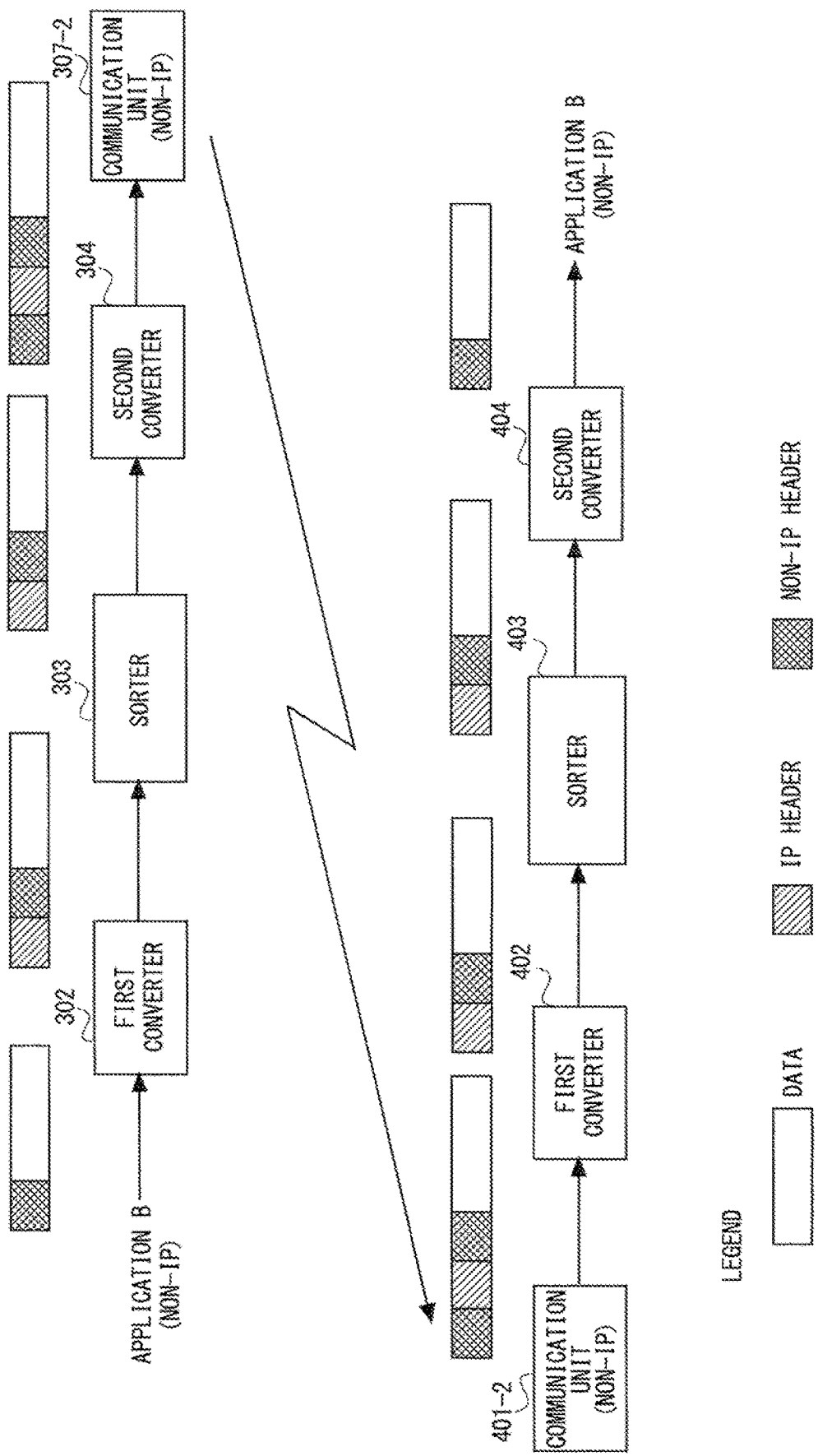
FIG. 8 is a view showing an example of a transmission process according to the first exemplary embodiment.

The case where non-IP data is transmitted in a transmission scheme that is not compatible with IP is described hereinafter. FIG. 8 is a view showing an example of a transmission process according to the first exemplary embodiment.

As shown in FIG. 8, non-IP data that is output from the application B is input to the first converter 302, containing a non-IP header, and it is converted into IP format. The specific processing is the same as described above with reference to FIG. 7.

The non-IP data that has been converted into IP format is input to the sorter 303, containing an IP header. The converted non-IP data is output to the second converter 304.

Then, in the second converter 304, the non-IP data that has been converted into IP format is converted into non-IP format. The converted non-IP data is output to the communication unit 307-2.

The non-IP data is then transmitted from the communication unit 307-2 to the communication device 400 in a transmission scheme that is not compatible with IP. The non-IP data is received by the communication unit 401-2 in the communication device 400. The non-IP data received by the communication unit 401-2 is output from the communication unit 401-2 to the first converter 402.

In the first converter 402, the non-IP data is converted into IP format. The converted non-IP data is then output to the sorter 403.

The sorter 403 checks on the received non-IP data converted into IP format, and determines an application to which the data is to be output based on the port number of the TCP/UDP header or the like. In the case of FIG. 8, because the non-IP data needs to be converted from IP format in order to be compatible with a non-IP application, the non-IP data is output from the sorter 403 to the second converter 404.

Then, in the second converter 404, the IP header is removed from the non-IP data converted into IP format, and further the non-IP header that has been handled as a part of data in IP format is set as header information. In other words, by conversion in the second converter 404, the non-IP data is converted from IP format into non-IP format.

The non-IP data after conversion is output from the second converter 404 to the application B. Because the non-IP data has been returned to its original non-IP format, it can be processed in the application B.

In this manner, in the case of transmitting non-IP data in a transmission scheme that is compatible with non-IP, the non-IP data is converted into IP format and further converted again into non-IP format and then transmitted at the transmitting end, and the non-IP data is converted into IP format and further converted back into non-IP format at the receiving end.

As described above, by converting the format of data in accordance with a combination of transmitting IP data or non-IP data in a transmission scheme that is compatible with IP or in a transmission scheme that is not compatible with IP, it is possible to support different data and format.

The communication device according to the first exemplary embodiment selects the most appropriate communication route from a plurality of transmission schemes, unifies application data into a specified format at the sorting step, and then further converts the data into a format of the most appropriate communication route according to need, and it is thereby possible to perform communications even when an application is not compatible with the data format or protocol of the most appropriate communication route.

Further, the communication device according to the first exemplary embodiment receives data transmitted through the most appropriate communication route, unifies the received data into a specified format, and then further converts the data into a format that is compatible with an application according to need, and it is thereby possible to perform communications using the most appropriate communication route among a plurality of transmission schemes even when an application is not compatible with the data format or protocol of the most appropriate communication route.

Second Exemplary Embodiment

In the second exemplary embodiment, an example in which non-IP data is transmitted in a transmission scheme that is compatible with non-IP without converting the format is described.

Figure 9:
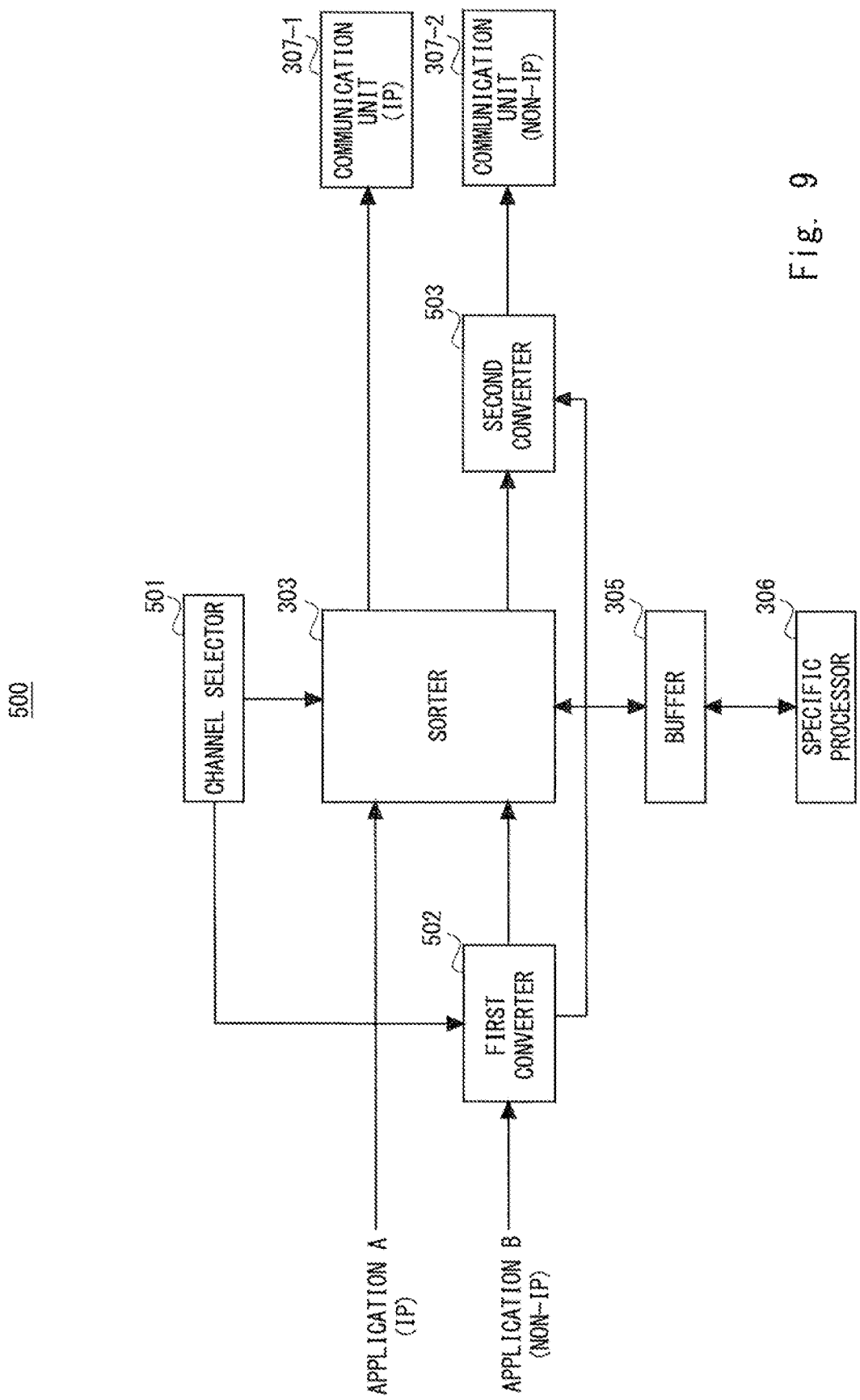
FIG. 9 is a block diagram showing an example of a communication device according to a second exemplary embodiment.

FIG. 9 is a block diagram showing an example of a communication device according to the second exemplary embodiment. In FIG. 9, the same elements as those in FIG. 3 are denoted by the same reference numerals and not redundantly described. In FIG. 9, a communication device 500 includes a route selector 501, a first converter 502, a sorter 303, a second converter 503, a buffer 305, a specific processor 306, and communication units 307-1 and 307-2.

The route selector 501 searches for the most appropriate communication route based on terminal information and communication environment information, and selects the most appropriate communication route. The route selector 501 then gives the sorter 303 an instruction to output data to a communication unit corresponding to the most appropriate communication route.

Further, the route selector 501 outputs, to the first converter 502, an instruction for not converting the format when transmitting non-IP application data in a non-IP transmission scheme.

The first converter 502 converts the format of non-IP application data and outputs the data converted into IP format to the sorter 303. The conversion of format is addition of an IP header, for example.

On the other hand, when an instruction for not converting the format is received from the route selector 501, the first converter 502 outputs non-IP application data to the second converter 503 without converting the format.

The sorter 303 outputs the IP data to the communication unit 307-1 or the second converter 503 in accordance with an instruction from the route selector 501. Further, when specific processing is required, the sorter 303 transmits the data to the specific processor 306 through the buffer 305, and outputs the data processed by the specific processor 306 to the communication unit 307-1 or the second converter 503 in accordance with an instruction from the route selector 501.

The second converter 503 converts the data output from the sorter 303 into non-IP application format, and then the second converter 503 adds, to the converted data, IP conversion determination data indicating that conversion from IP format is done, and outputs the data to the communication unit 307-2. Further, the second converter 503 does not convert the format of data output from the first converter 502, adds, to the data, IP conversion determination data indicating that conversion from IP format is not done, and outputs the data to the communication unit 307-2.

The route selector 501, the first converter 502, and the second converter 503 are preferably composed of a microcomputer or the like including ASIC or CPU.

In the above configuration, the communication device 500 converts application data in a different format into a format that is compatible with the most appropriate communication route and transmits the converted data. Hereinafter, a communication device that receives data transmitted from the communication device 500 shown in FIG. 9 is described.

Figure 10:
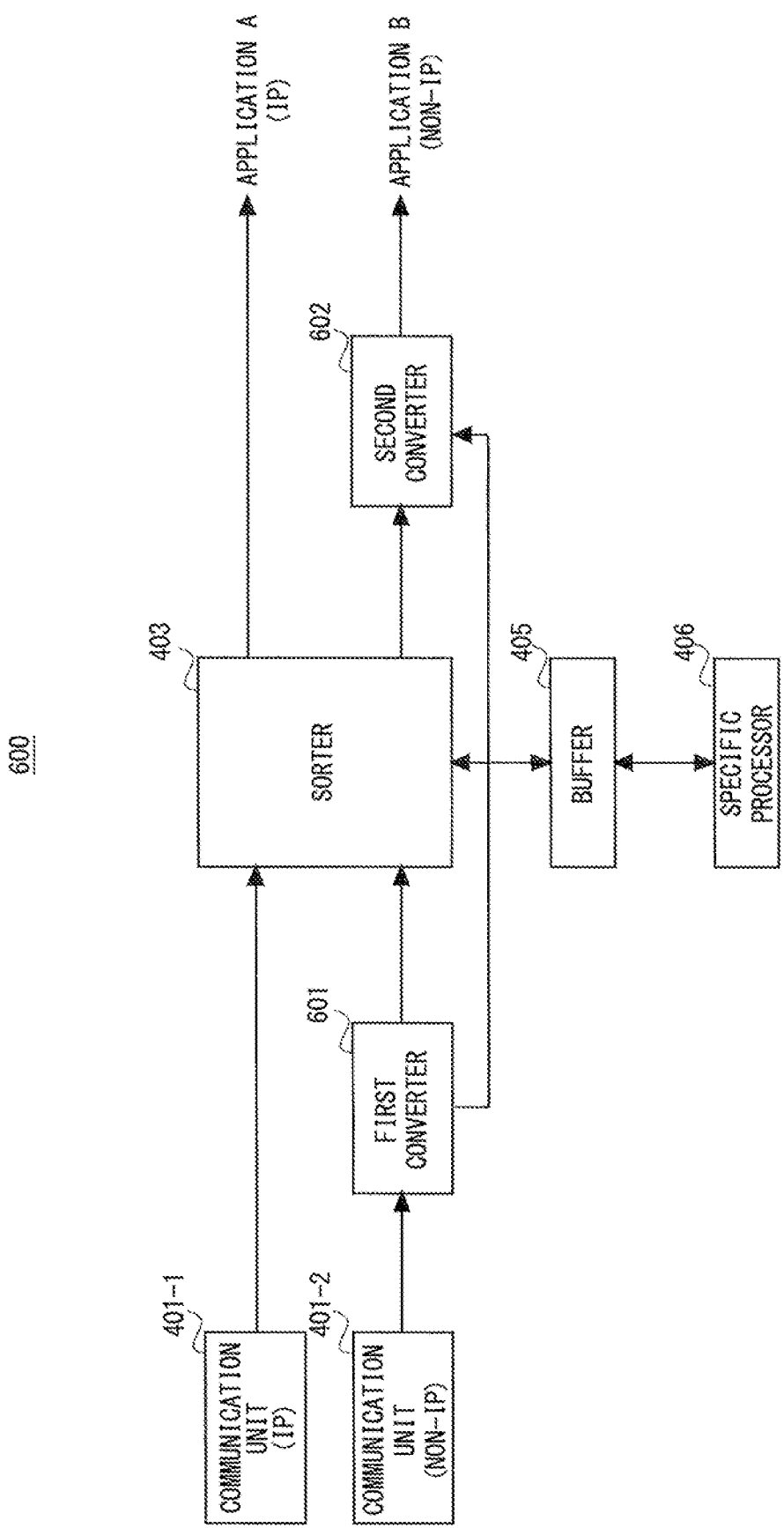
FIG. 10 is a block diagram showing an example of the communication device according to the second exemplary embodiment.

FIG. 10 is a block diagram showing the configuration of a communication device according to the second exemplary embodiment. In FIG. 10, the same elements as those in FIG. 4 are denoted by the same reference numerals and not redundantly described. In FIG. 10, a communication device 600 includes communication units 401-1 and 401-2, a first converter 601, a sorter 403, a second converter 602, a buffer 405, and a specific processor 406.

The communication unit 401-1 receives data transmitted from the communication device 500 of FIG. 9 in a transmission scheme that is compatible with IP, and outputs the data to the sorter 403. The communication unit 401-2 receives data transmitted from the communication device 500 of FIG. 9 in a transmission scheme that is not compatible with IP, and outputs the data to the first converter 601.

The first converter 601 checks the IP conversion determination data of the data received by the communication unit 401-2. When the IP conversion determination data indicates that conversion from IP format is done, the first converter 601 removes the IP conversion determination data from the received data and converts it into IP format, and outputs the converted data to the sorter 403.

On the other hand, when the IP conversion determination data indicates that conversion from IP format is not done, the first converter 601 only removes the IP conversion determination data from the received data and outputs the data to the second converter 602.

The sorter 403 outputs the data to the application A that is compatible with IP or the second converter 602 in accordance with header information of the data. Further, when specific processing is required, the sorter 403 outputs the data to the specific processor 406 through the buffer 405, and outputs the data processed by the specific processor 406 to the application A that is compatible with IP or the second converter 602.

The second converter 602 converts the data that is output from the sorter 403 into non-IP format, and outputs the converted data to the application B that is compatible with non-IP. On the other hand, the second converter 602 outputs the data that is output from the first converter 601 to the application B that is compatible with non-IP without converting it.

The first converter 601 and the second converter 602 are preferably composed of a microcomputer or the like including ASIC or CPU.

Communications between the communication device 500 in FIG. 9 and the communication device 600 in FIG. 10 are described hereinafter. Between the communication device 500 and the communication device 600, IP data or non-IP data is transmitted in a transmission scheme that is compatible with IP or a transmission scheme that is not compatible with IP. Hereinafter, communications are described for each combination of data and transmission scheme.

It should be noted that the case where IP data is transmitted in a transmission scheme that is compatible with IP is the same as the case of FIG. 5 in the first exemplary embodiment and not redundantly described. Likewise, the case where non-IP data is transmitted in a transmission scheme that is compatible with IP is the same as the case of FIG. 7 in the first exemplary embodiment and not redundantly described.

Figure 11:
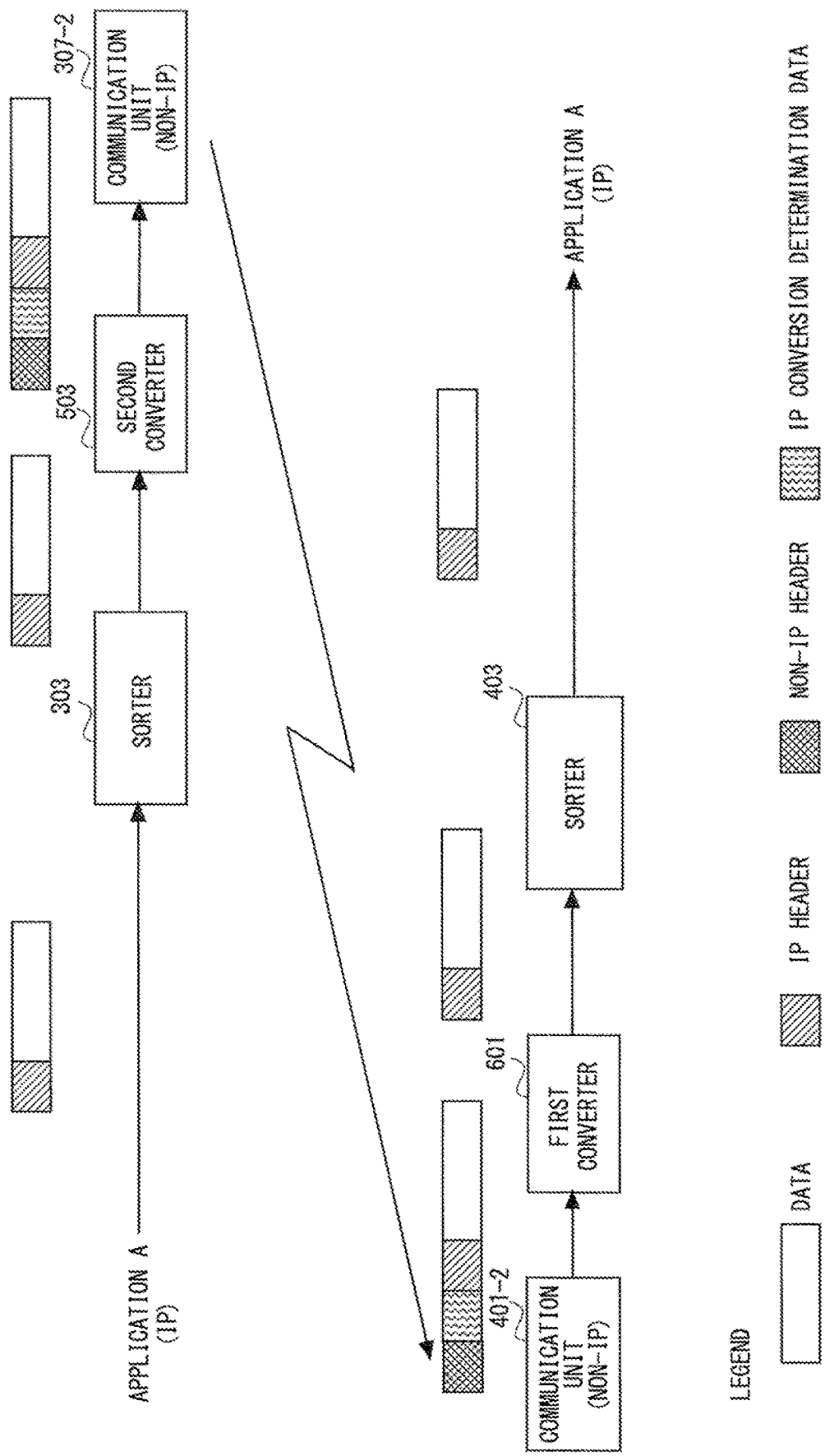
FIG. 11 is a view showing an example of a transmission process according to the second exemplary embodiment.

First, the case where IP data is transmitted in a transmission scheme that is not compatible with IP is described hereinafter. FIG. 11 is a view showing an example of a transmission process according to the second exemplary embodiment.

As shown in FIG. 11, IP data that is output from the application A is input to the sorter 303, containing an IP header. Because IP data is transmitted in a transmission scheme that is not compatible with IP in FIG. 11, the IP data is output from the sorter 303 to the second converter 503.

In the second converter 503, the IP data is converted into non-IP format. Then, IP conversion determination data indicating that conversion from IP format is done and a non-IP header are added to the IP data, and the converted IP data is output from the second converter 503 to the communication unit 307-2.

The IP data that has been converted into non-IP format is then transmitted from the communication unit 307-2 to the communication device 600 in a transmission scheme that is not compatible with IP. The IP data converted into non-IP format is received by the communication unit 401-2 in the communication device 600. The IP data converted into non-IP format is output from the communication unit 401-2 to the first converter 601.

In the first converter 601, the IP conversion determination data is checked in the IP data converted into non-IP format. Because the IP conversion determination data indicates that conversion from IP format is done, the non-IP header and the IP conversion determination data are removed. The IP data is then output to the sorter 403.

The sorter 403 checks on the received IP data, and the sorter 403 outputs the IP data to the application A that is compatible with IP.

In this manner, in the case of transmitting IP data in a transmission scheme that is not compatible with IP, the IP data is converted into non-IP format and transmitted at the transmitting end, and it is converted from non-IP format to IP format at the receiving end.

Figure 12:
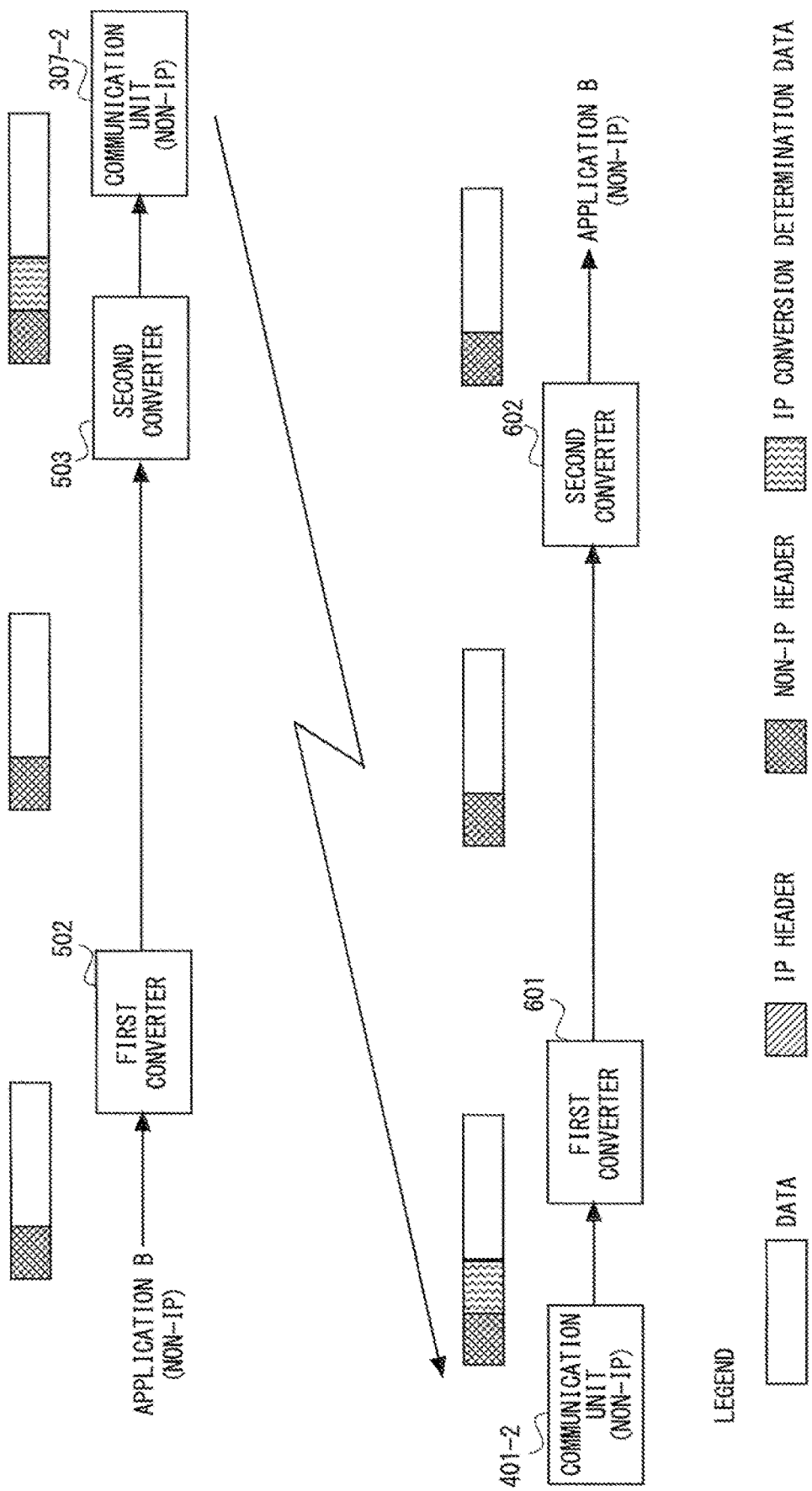
FIG. 12 is a view showing an example of a transmission process according to the second exemplary embodiment.

Next, the case where non-IP data is transmitted in a transmission scheme that is not compatible with IP is described hereinafter. FIG. 12 is a view showing an example of a transmission process according to the second exemplary embodiment.

As shown in FIG. 12, non-IP data that is output from the application B is input to the first converter 502, containing a non-IP header.

In the first converter 502, the non-IP data is output to the second converter 503.

In the second converter 503, the IP conversion determination data indicating that conversion from IP format is not done is added to the non-IP data, and the data is output to the communication unit 307-2.

The non-IP data is then transmitted from the communication unit 307-2 to the communication device 600 in a transmission scheme that is not compatible with IP. The non-IP data is received by the communication unit 401-2 in the communication device 600. The non-IP data received by the communication unit 401-2 is output from the communication unit 401-2 to the first converter 601.

In the first converter 601, the IP conversion determination data is checked in the non-IP data. Because the IP conversion determination data indicates that conversion from IP format is not done, the IP conversion determination data only is removed from the non-IP data, and the non-IP data is output from the first converter 601 to the second converter 602.

The non-IP data after conversion is output from the second converter 602 to the application B. Because the non-IP data stays in non-IP format, it can be processed in the application B.

As described above, when the communication device selects the most appropriate communication route from a plurality of transmission schemes and converts application data into the format of the most appropriate communication route, if the format of the data and the format compatible with the most appropriate communication route are the same, the communication device according to the second exemplary embodiment transmits the data without converting the format, and it is thereby possible to reduce the amount of processing in the communication device.

Further, when the communication device receives data transmitted through the most appropriate communication route, if the format compatible with the most appropriate communication route and the format of the data are the same, the communication device according to the second exemplary embodiment uses the data for an application without converting the format, and it is thereby possible to reduce the amount of processing in the communication device.

Third Exemplary Embodiment

In the third exemplary embodiment, an example of application to a relay device that relays communications is described.

Figure 13:
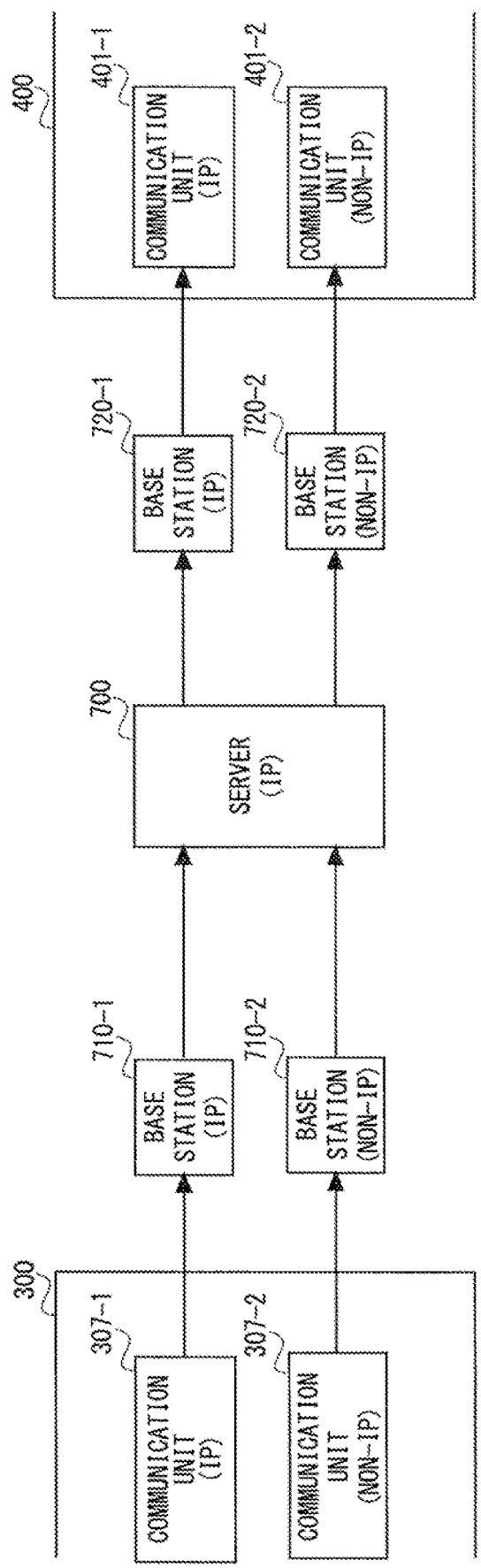
FIG. 13 is a block diagram showing the configuration of a communication system including a relay device according to a third exemplary embodiment.

FIG. 13 is a block diagram showing the configuration of a communication system including a relay device according to the third exemplary embodiment. In FIG. 13, a relay device 700 is a relay device that relays data received by a base station 710-1 or a base station 710-2 and outputs the data to a base station 720-1 or a base station 720-2. The detailed configuration of the relay device 700 is described later.

The base station 710-1 is a base station device that receives data in a transmission scheme that is compatible with IP. For example, the base station 710-1 receives data transmitted from the communication unit 307-1 of the communication device 300 according to the second exemplary embodiment.

The base station 710-2 is a base station device that receives data in a transmission scheme that is not compatible with IP. For example, the base station 710-2 receives data transmitted from the communication unit 307-2 of the communication device 300 according to the second exemplary embodiment.

The base station 720-1 is a base station device that transmits data in a transmission scheme that is compatible with IP. For example, the base station 720-1 transmits data to the communication unit 401-1 of the communication device 400 according to the second exemplary embodiment in a transmission scheme that is compatible with IP.

The base station 720-2 is a base station device that transmits data in a transmission scheme that is not compatible with IP. For example, the base station 720-2 transmits data to the communication unit 401-2 of the communication device 400 according to the second exemplary embodiment in a transmission scheme that is not compatible with IP.

The relay device 700 selects the most appropriate communication route for each of communications with the communication device 300 through the base station 710-1 or the base station 710-2 and communications with the communication device 400 through the base station 720-1 or the base station 720-2.

For example, when the most appropriate communication route between the relay device 700 and the communication device 300 is a transmission scheme that is compatible with IP and the most appropriate communication route between the relay device 700 and the communication device 400 is a transmission scheme that is not compatible with IP, the relay device 700 converts the format of data received by the base station 710-1 into non-IP format and transmits it from the base station 720-2.

Likewise, when the most appropriate communication route between the relay device 700 and the communication device 300 is a transmission scheme that is not compatible with IP and the most appropriate communication route between the relay device 700 and the communication device 400 is a transmission scheme that is compatible with IP, the relay device 700 converts the format of data received by the base station 710-2 into IP format and transmits it from the base station 720-1.

Figure 14:
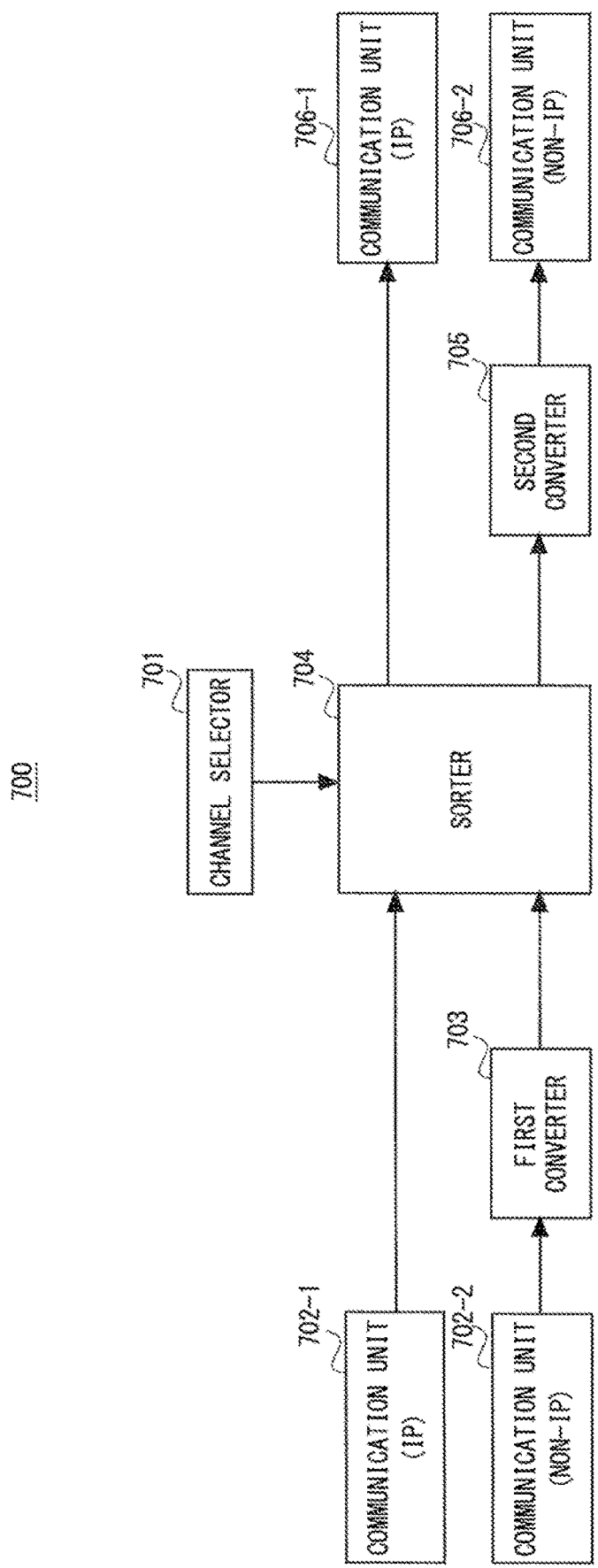
FIG. 14 is a block diagram showing the configuration of a communication device according to the third exemplary embodiment.

The configuration of the relay device 700 is described hereinbelow. FIG. 14 is a block diagram showing the configuration of a communication device according to the third exemplary embodiment.

In FIG. 14, the relay device 700 includes a route selector 701, communication units 702-1 and 702-2, a first converter 703, a sorter 704, a second converter 705, and communication units 706-1 and 706-2.

The route selector 701 searches for the most appropriate communication route based on communication environment information and supports the most appropriate communication route. The route selector 701 then gives the sorter 704 an instruction to output data to a communication unit corresponding to the most appropriate communication route.

The communication unit 702-1 is a communication unit that receives data in IP format. The communication unit 702-2 is a communication unit that receives data in non-IP format.

The first converter 703 converts the format of non-IP data and outputs the data converted into IP format to the sorter 704. The conversion of format is removal of a non-IP header and addition of an IP header, for example.

The sorter 704 outputs the IP data to the communication unit 706-1 or the second converter 705 in accordance with an instruction from the route selector 701.

The second converter 705 converts the data output from the sorter 704 into non-IP format and outputs the converted data to the communication unit 706-2.

The route selector 701, the first converter 703, the sorter 704 and the second converter 705 are preferably composed of a microcomputer or the like including ASIC or CPU.

The communication unit 706-1 is a communication unit that transmits data in IP format. The communication unit 706-2 is a communication unit that transmits data in non-IP format.

In the above configuration, the relay device 700 converts communication data in a different format into a format that is compatible with the most appropriate communication route and transmits the converted data.

As described above, the communication device according to the third exemplary embodiment selects the most appropriate communication route from a plurality of transmission schemes, converts the received data into a format that is compatible with the most appropriate communication route and transmits the converted data, and it is thereby possible to perform communications even when the most appropriate communication route is different between a communication route at the receiving end and a communication route at the transmitting end.

Note that, the configuration of the second exemplary embodiment may be applied to the configuration of the relay device 700. In this case, removal of a non-IP header, addition of an IP header or the like is determined based on the IP conversion determination data.

Fourth Exemplary Embodiment

Figure 15:
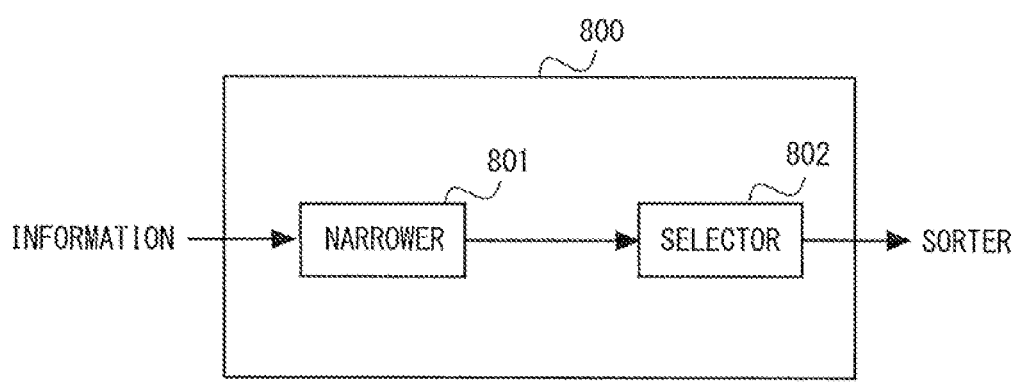
FIG. 15 is a block diagram showing the configuration of a route selector according to a fourth exemplary embodiment.

In the fourth exemplary embodiment, specific configurations of the route selector 101 in the first exemplary embodiment, the route selector 301 in the second exemplary embodiment and the route selector 501 in the third exemplary embodiment are described. FIG. 15 is a block diagram showing the configuration of a route selector according to the fourth exemplary embodiment. In FIG. 15, a route selector 800 includes a narrower 801 and a selector 802.

The narrower 801 estimates a relative distance from the other end of a communication based on the position information of its own device and the position information of the other end of a communication, and narrows down available communication schemes based on measurement results of a radio range or a communication route congestion level.

Note that, in the case where one or both of its own device and the other end of a communication is a mobile communication device, an available communication time is calculated based on a moving speed and a moving direction in addition to a distance, and communication schemes are narrowed down in consideration of the available communication time. For example, in the case of a mobile communication, it is assumed that there is an actually available communication time (period) for each communication scheme. This can be estimated based on the distance (or relative positions) between the transmitting and receiving ends and each movement vector (moving direction+speed).

To be specific, the narrower 801 narrows down available communication schemes based on metadata (e.g., volume of data, allowable transmission time, necessity of concealment) of communication data notified by an application. A required transmission rate can be calculated by: required transmission rate=(volume of data (number of bits)/allowable transmission time (number of seconds)).

Further, an available rate for each communication scheme can be estimated by: available rate=average transmission rate of communication scheme−transmission rate currently in use.

When there are limitations on the available communication time, the volume of data that can be transmitted can be estimated for each communication scheme by: available rate×available communication time=volume of data that can be transmitted.

The narrower 801 then excludes, from choices of communication schemes, those that do not meet metadata requirements notified from an application by using those values.

For example, in the case where there are four communication schemes: communication scheme A: 100 Mbps, concealment is possible, communication scheme B: 10 Mbps, concealment is possible, communication scheme C: 1 Mbps, concealment is possible, and communication scheme D: 1000 Mbps, concealment is not possible, and the volume of data: 1 MB (=8 Mbit), the allowable transmission time: 1 second, and the necessity of concealment: necessary are specified from an application, the communication scheme C is excluded because of requirements for the allowable transmission time, and the communication scheme D is also excluded because of the necessity of concealment.

The selector 802 selects a communication scheme compatible with the most appropriate communication route from the communication schemes narrowed down by the narrower 801. For example, the selector 802 selects a communication scheme that is considered to be suitable based on higher priority items in each of various applications, such as streaming, synchronization with cloud data and upload of a large volume of data as application operations.

To be specific, because the communication scheme A: high speed and high power and the communication scheme B: intermediate speed and low power, the selector 802 selects the communication scheme A when placing a higher priority on speed. On the other hand, the selector 802 selects the communication scheme B when placing a higher priority on power in order to endure long-term use.

Even when none of the communication schemes meets the requirements, if the final destination of communication data is not connection equipment (e.g., base station etc.) and the allowable transmission time is long enough (when it is a server on a cloud etc.), control is done as follows:
When data partitioning transmission is possible, a communication device transmits data as much as possible during the available communication time.
When data partitioning transmission is not possible, a communication device does not perform communications and waits for another chance of communication.

As described above, the communication device that includes the route selector according to the fourth exemplary embodiment selects a transmission scheme that meets the requirements for data transmission and can thereby select the most appropriate communication route.

It should be noted that the present invention is not limited to the above-described exemplary embodiments and may be varied in many ways within the scope of the present invention. For example, although only one of the transmitting end and the receiving end is included in the above description, the communication device may include both of the transmitting end and the receiving end. In this case, two-way communications can be implemented.

For example, although an example in which there are two types of transmission schemes of communication units is described in the above exemplary embodiments, the communication device may include three or more types of communication units. Further, there may be three or more types of formats of applications. Likewise, there may be three or more types of formats of transmission schemes.

Further, the format to be unified is not limited to IP format, and the layer of the format to be unified is not limited to the layer of IP.

Further, format conversion may include processing other than addition or removal of a header. For example, format conversion may include processing of data partitioning or combining, data encoding or decoding or the like.

Further, the present invention may be applied to any of wireless communications, wired communications, or communications combining both wireless and wired. Further, wired transmission is not limited to IP and non-IP transmission methods, and the present invention may be applied to Ethernet (registered trademark), for example.

For each exemplary embodiment, it may be implemented by hardware such as ASIC (Application Specific Integrated Circuit) or software. Further, a part of the processing may be implemented by software and the other part may be implemented by hardware. In the implementation by software, a computer system that includes one or a plurality of CPU (Central Processing Unit) such as a microprocessor executes a program related to processing of functional blocks. Such a program can be stored and provided to the computer using any type of non-transitory computer readable medium. The non-transitory computer readable medium includes any type of tangible storage medium.

Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R , CD-R/W, DVD-ROM (Digital Versatile Disc Read Only Memory), DVD-R (DVD Recordable)), DVD-R DL (DVD-R Dual Layer)), DVD-RW (DVD ReWritable)), DVD-RAM), DVD+R), DVR+R DL), DVD+RW), BD-R (Blu-ray (registered trademark) Disc Recordable)), BD-RE (Blu-ray (registered trademark) Disc Rewritable)), BD-ROM), and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

This application is based upon and claims the benefit of priority from Japanese patent application No. 2015-31707 filed on Feb. 20, 2015, the disclosure of which is incorporated herein in its entirety by reference.

INDUSTRIAL APPLICABILITY

The present invention is applicable to a wireless communication system using a plurality of different transmission schemes.

REFERENCE SIGNS LIST 100, 200, 300, 400, 500, 600 COMMUNICATION DEVICE
101 ROUTE SELECTOR
102, 202 CONVERTER/SORTER
103-1, 103-2, 201-1, 201-2, 307-1, 307-2, 401-1, 401-2, 702-1, 702-2,
706-1, 706-2 COMMUNICATION UNIT
301, 501, 701, 800 ROUTE SELECTOR
302, 402, 502, 601, 703 FIRST CONVERTER
303, 403, 704 SORTER
304, 404, 503, 602, 705 SECOND CONVERTER
305, 405 BUFFER
306, 406 SPECIFIC PROCESSOR
700 RELAY DEVICE
710-1, 710-2, 720-1, 720-2 BASE STATION
801 NARROWER
802 SELECTOR

What is claimed is:

1. A communication device comprising:
one or more memories storing instructions; and
one or more processors configured to execute the instructions to:
control a first converter to:
convert first Non-Internet Protocol (non-IP) data into first Internet Protocol (IP) data,
control a sorter to:
obtain the first IP data from the first converter,
output second IP data to a second converter, wherein the second IP data is based on the first IP data,
obtain third IP data from a first application, and
output fourth IP data to a first communication interface without converting a format of the fourth IP data, wherein the fourth IP data is based on the third IP data, and
control the second converter to:
convert the second IP data into second non-IP data and output the second non-IP data to a second communication interface.

2. The communication device according to claim 1, further comprising:
the first communication interface, and
the second communication interface, wherein
the one or more processors are further configured to execute the instructions to:
control the first communication interface to:
obtain the fourth IP data from the sorter, and
send the fourth IP data using an IP protocol, and
control the second communication interface to:
obtain the second non-IP data from the second converter, and
send the second non-IP data using a non-IP protocol.

3. The communication device according to claim 1, wherein
the one or more processors are further configured to execute the instructions to control:
the first converter to obtain the first non-IP data from a second application.

4. The communication device according to claim 1, wherein
the one or more processors are further configured to execute the instructions to control a channel selector to:
determine data is to be sent using a non-IP protocol, and
control the sorter to output the data to the second converter as the second IP data.

5. The communication device according to claim 2, wherein
the one or more processors are further configured to execute the instructions to control a channel selector to:
determine whether data is to be sent using the IP protocol or the non-IP protocol, and
control the sorter to output the data to the first communication interface as the fourth IP data or to the second converter as the second IP data.

6. The communication device according to claim 1, further comprising:
the first communication interface, and
the second communication interface, wherein
the one or more processors are further configured to execute the instructions to:
control the first communication interface to:
output seventh IP data to the sorter, and
control the second communication interface to:
output third non-IP data to the first converter.

7. The communication device according to claim 1, wherein
the one or more processors are further configured to execute the instructions to:
control the sorter to send eighth IP data to the first application, and
control the second converter to send fourth non-IP data to a second application.

8. The communication device according to claim 1, wherein
the communication device is configured to send data to and receive data from another corresponding communication device.

9. A method of controlling a communication device including a first converter, a second converter and a sorter, the method comprising:
controlling the first converter to convert first Non-Internet Protocol (non-IP) data into first Internet Protocol (IP) data;
controlling the sorter to obtain the first IP data from the first converter;
controlling the sorter to; i) output second IP data to the second converter, wherein the second IP data is based on the first IP data, ii) obtain third IP data from a first application, and iii) output fourth IP data to a first communication interface without converting a format of the fourth IP data, wherein the fourth IP data is based on the third IP data; and
controlling the second converter to convert the second IP data into second non-IP data and output the second non-IP data to a second communication interface.

10. The method according to claim 9, further comprising:
controlling the first communication interface of the communication device to obtain the fourth IP data from the sorter;
controlling the first communication interface to send the fourth IP data using an IP protocol;
controlling the second communication interface of the communication device to obtain the second non-IP data from the second converter; and controlling the second communication interface to send the second non-IP data using a non-IP protocol.

11. The method according to claim 9, further comprising:
controlling the first converter to obtain the first non-IP data from a second application.

12. The method according to claim 9, further comprising:
controlling a channel selector of the communication device to determine data is to be sent using a non-IP protocol; and
controlling the channel selector to control the sorter to output the data to the second converter as the second IP data.

13. The method according to claim 10, further comprising:
controlling a channel selector of the communication device to determine whether data is to be sent using the IP protocol or the non-IP protocol; and
controlling the sorter to output the data to the first communication interface as the fourth IP data or to the second converter as the second IP data.

14. The method according to claim 9, further comprising:
controlling the first communication interface of the communication device to output seventh IP data to the sorter, and
controlling the second communication interface of the communication device to output third non-IP data to the first converter.

15. The method according to claim 9, further comprising:
controlling the sorter to send eighth IP data to the first application; and
controlling the second converter to send fourth non-IP data to a second application.

16. A non-transitory computer readable medium storing instructions that, when executed by a processor of a communication device including a first converter, a second converter and a sorter, cause the communication device to perform a method comprising:
controlling the first converter to convert first Non-Internet Protocol (non-IP) data into first Internet Protocol (IP) data;
controlling the sorter to; i) obtain the first IP data from the first converter; output second IP data to the second converter, wherein the second IP data is based on the first IP data, ii) obtain third IP data from a first application, and iii) output fourth IP data to a first communication interface without converting a format of the fourth IP data, wherein the fourth IP data is based on the third IP data; and
controlling the second converter to convert the second IP data into second non-IP data and output the second non-IP data to a second communication interface.

* * * * *